(12) United States Patent  (10) Patent No.: US 7,400,378 B2
Michelson et al.  (45) Date of Patent: Jul. 15, 2008

(54) DUAL SPROCKET CONTACT MOTION PICTURE FILM PRINTER

(75) Inventors: Manfred G. Michelson, 4725 Calle Quetzal, Camarillo, CA (US) 93012-9101; Markus G. Michelson, Camarillo, CA (US)

(73) Assignee: Manfred G. Michelson, Camarillo, CA (US)

( * ) Notice: Subject to any disclaimer, the term of this patent is extended or adjusted under 35 U.S.C. 154(b) by 264 days.

(21) Appl. No.: 11/202,710

(22) Filed: Aug. 11, 2005

(65) Prior Publication Data

US 2006/0033881 A1  Feb. 16, 2006

Related U.S. Application Data

(60) Provisional application No. 60/600,531, filed on Aug. 11, 2004.

(51) Int. Cl.
*G03B 15/08* (2006.01)
*G03B 27/02* (2006.01)

(52) U.S. Cl. .......................................... 352/244; 355/78

(58) Field of Classification Search ................... 353/78, 353/91, 92, 104, 123, 132; 352/244, 183, 352/184
See application file for complete search history.

(56) References Cited

U.S. PATENT DOCUMENTS

| | | | | |
|---|---|---|---|---|
| 2,153,214 A | * | 4/1939 | Tondreau | 355/111 |
| 2,235,907 A | * | 3/1941 | Tondreau | 355/98 |
| 3,970,386 A | * | 7/1976 | Wohlrab | 355/111 |
| 4,053,230 A | * | 10/1977 | Balousek | 355/104 |
| 5,225,869 A | * | 7/1993 | Levine et al. | 355/102 |
| 5,812,245 A | * | 9/1998 | Goodhill et al. | 355/97 |

* cited by examiner

*Primary Examiner*—Rodney E Fuller
(74) *Attorney, Agent, or Firm*—Wagner, Anderson & Bright, LLP; Roy L Anderson (57) ABSTRACT

A dual sprocket contact motion picture film printer maintains film steadiness when running a film negative in contact with an unexposed raw stock film by tensioning perforations along one film side against sprocket teeth of a full fitting sprocket and a shrinkage sprocket on the other side. The films pass through a fluid chamber before passing through a printer aperture and a vacuum pressure applied from one side of the chamber tensions the negative against the sprocket teeth while a positive fluid pressure applied from an opposite side tensions the raw stock against the sprocket. The films are self-aligned by the fluid forces maintaining equal tension on both sides of each film strip as the films pass the aperture of the film printer.

15 Claims, 9 Drawing Sheets

FIG. 1

(PRIOR ART)

DUAL SPROCKET CONTACT MOTION PICTURE FILM PRINTER

CROSS REFERENCE TO RELATED APPLICATIONS

The present invention is a continuation-in-part of U.S. Patent Application No. 60/600,531, filed Aug. 11, 2004, the disclosure of which is specifically incorporated herein by reference.

FIELD OF THE INVENTION

This Invention relates to film printers and more particularly to a dual sprocket contact film printer having an improved method of feeding a film negative and a raw stock film onto a dual printing sprocket so as to increase film steadiness and film resolution (sharpness).

BACKGROUND OF THE INVENTION

Figure 1:
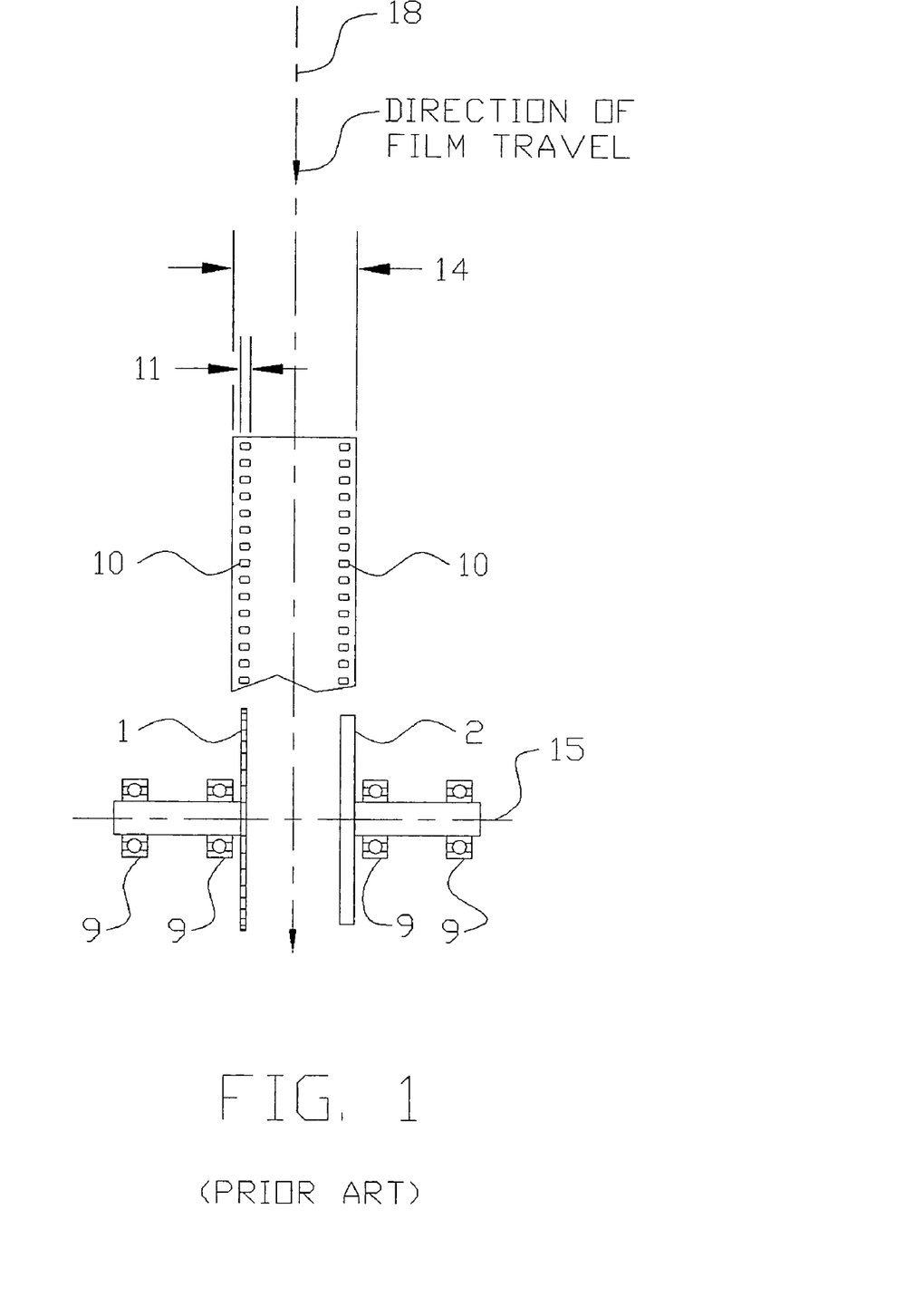
FIG. 1 is a fragmentary semi-schematic elevational view partly in cross-section showing a front view of a prior art contact film printer using a full fitting sprocket on one side and a free running ring on the other side.
Figure 2:
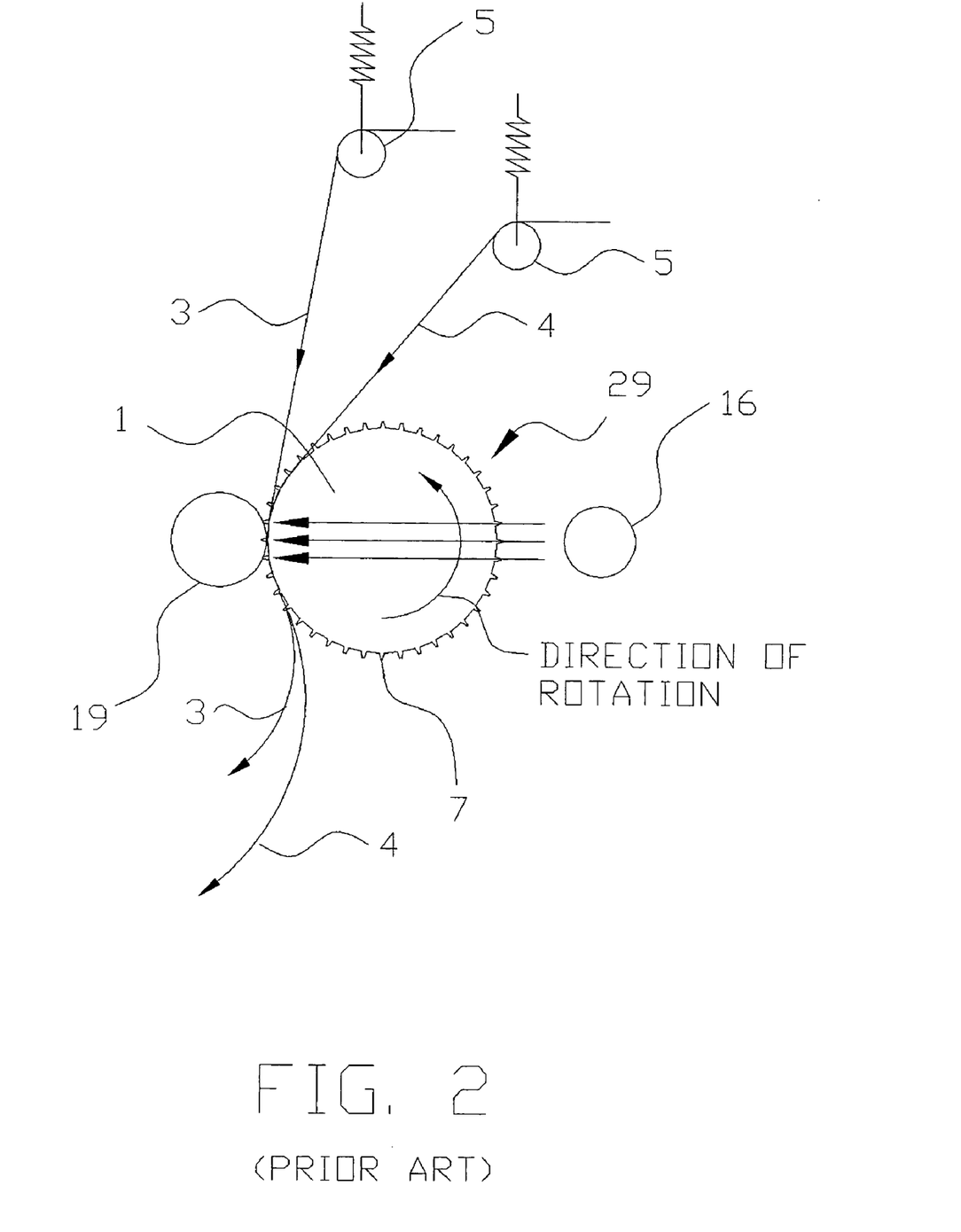
FIG. 2 is a semi-schematic side elevational view showing a prior art contact printer with spring-biased tension rollers used to apply tension to a film negative and a raw stock film in order to maintain film steadiness.

Referring to FIGS. 1 and 2, the operational principle of contact film printers consists of running a film negative 4 in contact with an unexposed film raw stock (R/S) 3 over a film sprocket (or printing sprocket) 29 and exposing the R/S with a light source 16 which illuminates the R/S through the negative 4. The raw stock 3 and the negative 4 are held in close contact against the printing sprocket 29 by a gate roller 19. The sprocket engages spaced apart perforations along both sides of the film.

Many existing contact printers use a printing sprocket 29 having a single full fitting sprocket 1 on one side and a free running ring 2 on the other side, as shown in FIG. 1. The full fitting sprocket has sprocket teeth 7 which are approximately as wide as the film perforation width 11. Both the printing sprocket and the free running ring have separate rotating shafts and are independently mounted on ball bearings 9 aligned on a common axis of rotation 15.

Figure 3:
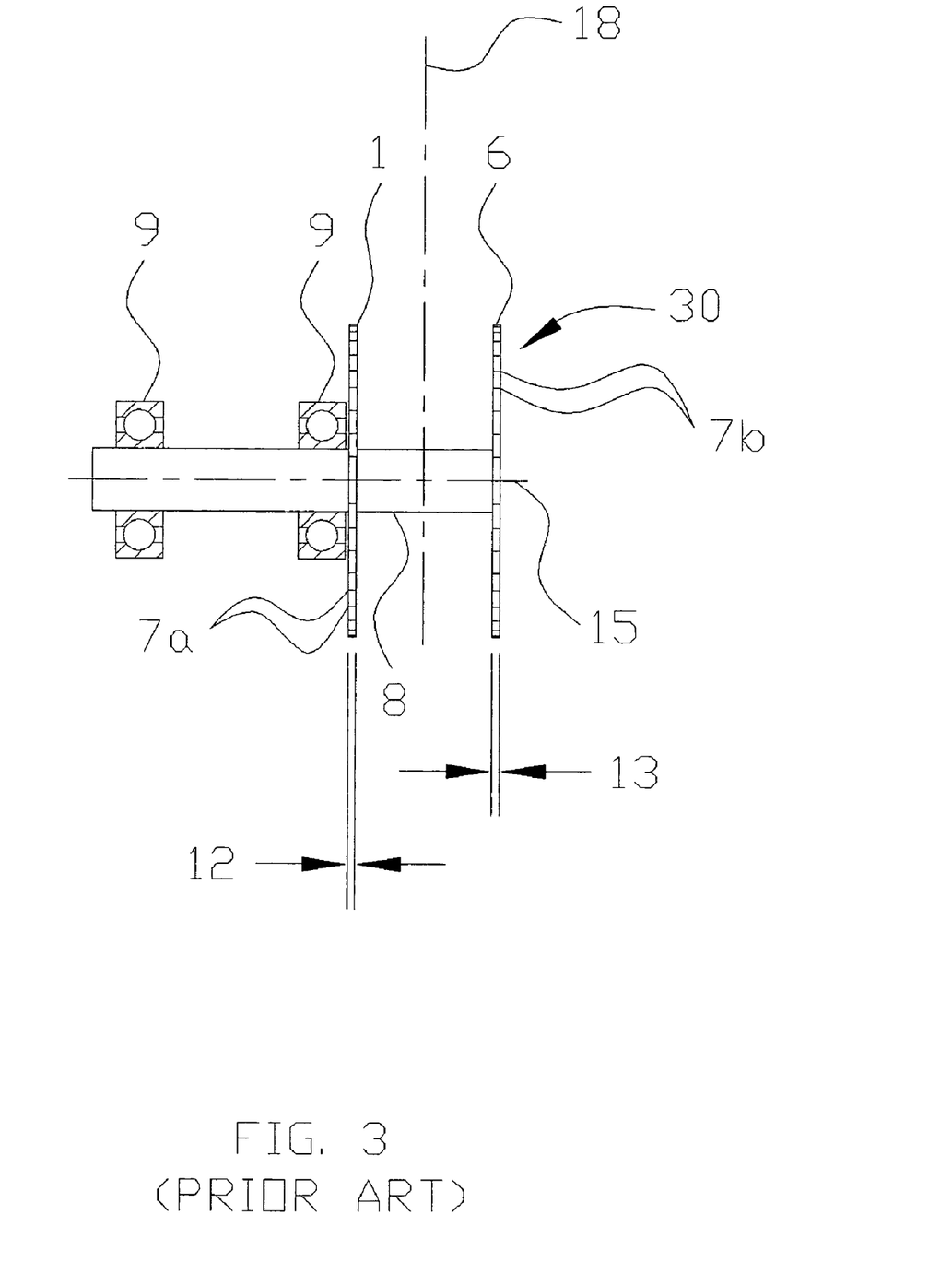
FIG. 3 is a semi-schematic front elevational view similar to FIG. 1, showing a prior art dual sprocket printer comprising a full fitting sprocket on one side and a shrinkage sprocket on the other side.

As shown in FIG. 3, some film printers use a dual printing sprocket 30 comprised of a full fitting sprocket 3- and a shrinkage sprocket 6. (In this case, the free running ring 2 shown in FIG. 1 has been replaced by the shrinkage sprocket 6 shown in FIG. 3.) The full fitting sprocket has sprocket teeth 7a and the shrinkage sprocket has sprocket teeth 7b. The tooth width 12 of the full fitting sprocket is shown in FIG. 3. The tooth width 13 of the shrinkage sprocket 6 is substantially narrower than the width 11 of the film perforation. (The narrower width is intended to compensate for film shrinkage or expansion.) The full fitting sprocket 1 and the shrinkage sprocket 6 are tied together on a common shaft 8 shown in FIG. 3. This design is referred to as a dual sprocket design.

Both the single sprocket and dual sprocket printers have problems with picture steadiness. Picture unsteadiness is introduced into the print when the negative 4 moves relative to the raw stock 3 during exposure. (The print is the developed or processed R/S on which the image is visible.) With the single sprocket, the steadiness problem is more severe on the free running ring side than on the sprocket side. To ensure a steady picture, the perforations 10 of both the negative and the R/S are tensioned against at least one sprocket tooth 7 of the printing sprocket. In the case of a dual sprocket, at least one perforation 10 on each side of the film must be tensioned against at least one sprocket tooth on the full fitting sprocket 1 and on one sprocket tooth on the shrinkage sprocket 6.

Prior art film printers have used spring tensioning rollers 5 shown in FIG. 2 to provide tension to the negative and the R/S; however, if the film becomes misaligned the tensioning system does not automatically correct for such misalignment because the rollers are fixed in position except for lateral movement allowed for by their tension spring. Even small misalignments of one or two thousandths of an inch can ultimately produce undesired jitter on the screen since the film is magnified up to about 100 times with current motion picture projection equipment.

Accordingly, there is a long felt need for a way to improve film processing by e curing the problems associated with film feed misalignment.

SUMMARY OF THE INVENTION

The present invention is generally directed to a contact film printer with a dual sprocket (a full fitting sprocket and a shrinkage sprocket) for feeding a negative and a raw stock together to an aperture for exposing such films to a light source in which means are provided for ensuring that perforations on both sides of the negative and the raw stock uniformly contact the sprocket teeth of the dual sprocket under tension which is equalized on both sides of the films.

In a separate group of aspects of the present invention, a method for feeding such a contact film printer is disclosed in which the negative and the raw stock are fed into a chamber, a first pressure (which can be negative) is applied in the chamber to a cell side of the negative, a second pressure (which can be positive) is applied in the chamber to a cell side of the stock, both the negative and the stock are deflected in the same direction in the chamber and the negative and the raw stock are then fed to the dual sprocket such that both the left and the right set of perforations of the negative and the raw stock contact teeth of the dual sprocket under tension. (The left set of perforations of the negative and the raw stock and the right set of perforations of the negative and the raw stock can be made to uniformly contact teeth of the dual sprocket under tension which is equalized on both the left and right sides of the negative and the raw stock.) At least one roller can also be used to force the negative and the stock against a first root of the full fitting sprocket and a second root of the shrinkage sprocket. The chamber can be filled with a liquid and both the first and the second pressures can be hydraulic pressures, in which case a pressurized fluid can also be used to force out any liquid trapped between the emulsion sides of the negative and the stock so that they are in face-to-face contact when they move past the aperture, or the chamber can be filled with a gas and both the first and the second pressures can be pneumatic pressures.

In another separate group of aspects of the present invention, a contact film printer has a sprocket for engaging spaced-apart perforations along both sides of a film entering the printer, an aperture for exposing overlapping films (i.e., a negative film and a raw stock film) to light as the sprocket rotates to move the films past the aperture, and a fluid chamber positioned adjacent the sprocket ahead of the aperture, the films passing under tension through the fluid chamber prior to passing through the aperture, the fluid chamber containing a source of fluid applied to one or more sides of the films to pull the film perforations against the sprocket teeth on the rotating sprocket on both sides of the sprocket so as to equalize the tension on both sides of the films for engaging the perforations on both sides of the films with the sprocket teeth equally as the sprocket rotates to move the film past the aperture. An upper gate roller can maintain the overlapping films in contact with each other with the perforations against the root of the sprocket teeth on both sides of the sprocket at a point between the fluid chamber and the aperture and a lower gate roller can press the overlapping films into contact below the upper gate roller and in the vicinity of the aperture. An elongated nozzle can apply fluid pressure to the overlapping films on a side opposite the upper gate roller for squeezing any fluid out from between the films prior to the films passing through the aperture.

In a further separate group of aspects of the present invention, a contact film printer has a dual sprocket for engaging spaced apart perforations along both sides of a film negative and raw stock film entering the printer, an aperture for exposing the overlapping films to light as the sprocket rotates to move the films past the aperture, and a pair of self-aligning rollers adjacent the sprocket and positioned ahead of the aperture so that the films are passed under tension over their respective self-aligning rollers prior to passing through the aperture. The self-aligning rollers are adapted for movement to compensate for slight misalignments of either of the films to pull the film perforations against the sprocket teeth on the rotating sprocket on both sides of the sprocket so as to self-align and equalize the tension on both sides of the film for engaging the perforations on both sides of the film with the sprocket teeth equally as the sprocket rotates to move the film past the aperture. The self-aligning rollers have flanged ends, a spring-biased lever arm and a shaft about which the rollers rotate mounted to the roller on self-aligning bearings.

Accordingly, it is a primary object of the present invention to provide an improved high speed motion picture film processor that feeds a film negative and a raw stock film onto a dual printing sprocket with increased film steadiness and film resolution (sharpness).

This and further objects and advantages will be apparent to those skilled in the art in connection with the drawings and the detailed description of the preferred embodiment set forth below.

DETAILED DESCRIPTION OF THE INVENTION

The present invention is directed to high speed motion picture film processors that use a dual sprocket design.

The present invention will now be described in connection with several especially preferred embodiments that illustrate various aspects of the inventive concepts described herein. In the Figures and the following more detailed description, numerals indicate various features of the invention, with like numerals referring to like features throughout both the drawings and the description. Although the Figures are described in greater detail below, the following is a glossary of the elements identified in the Figures:

1 full fitting sprocket
3 raw stock film
4 negative film
5 conventional tension roller
6 shrinkage sprocket
7a full fitting sprocket teeth
7b shrinkage sprocket teeth
7c bottom of the full fitting sprocket teeth 7a
7d bottom of the shrinkage sprocket teeth 7b
8 common shaft of dual sprocket 30
10 perforations
15 centerline through sprocket
16 light source
17 glass prism
18 centerline
19 conventional gate roller
20 upper gate roller
21 lower gate roller
22 pressurized fluid
23 nozzle
24 location of force from nozzle 23
25 pressure chamber side of chamber 31
26 vacuum chamber side of chamber 31
27 film aperture
28a fluid
28b fluid
30 dual printing sprocket
31 fluid chamber
32 in-feed rollers
33 groove
34 pivot point
35 elongated lever arm
36 self-aligning roller
37 self-aligning bearing
40 spring
39 flange
41 direction of film tension against sprocket teeth on opposite sides of films
42 direction of film travel
43 root of sprocket As shown in FIG. 2, the conventional design uses tension rollers 5 to feed the film onto the full fitting sprocket 1 and maintain film tension against the sprocket teeth of the sprocket 1. Ideally, the centerline 18 of both films (negative 4 and raw stock 3) should be parallel to a plane perpendicular to the centerline 15 through the sprocket. The theoretical centerline 18 of the film is a line which lies between the midpoint of the center of a set of opposing sprocket teeth 7a and 7b and is parallel to a plane which is perpendicular to the centerline 15 (see FIG. 3) of the common axis shaft. If for any reason the film at the tension rollers 5 moves away from the theoretical centerline, it will enter printing sprocket 30 at an angle (tension rollers 5 use two ball bearings about a fixed axis and only allow for movement parallel to the direction of travel of the negative and raw stock at the aperture in FIG. 2). Consequently, one set of perforations 10, either on the full fitting sprocket side or on the shrinkage sprocket side, will not fully contact the sprocket teeth. The result is an unsteady print. To ensure that the film centerline 18 remains parallel to the theoretical centerline, there should be little or no force acting on the film to skew the film as it enters the film aperture 27.

Figure 4:
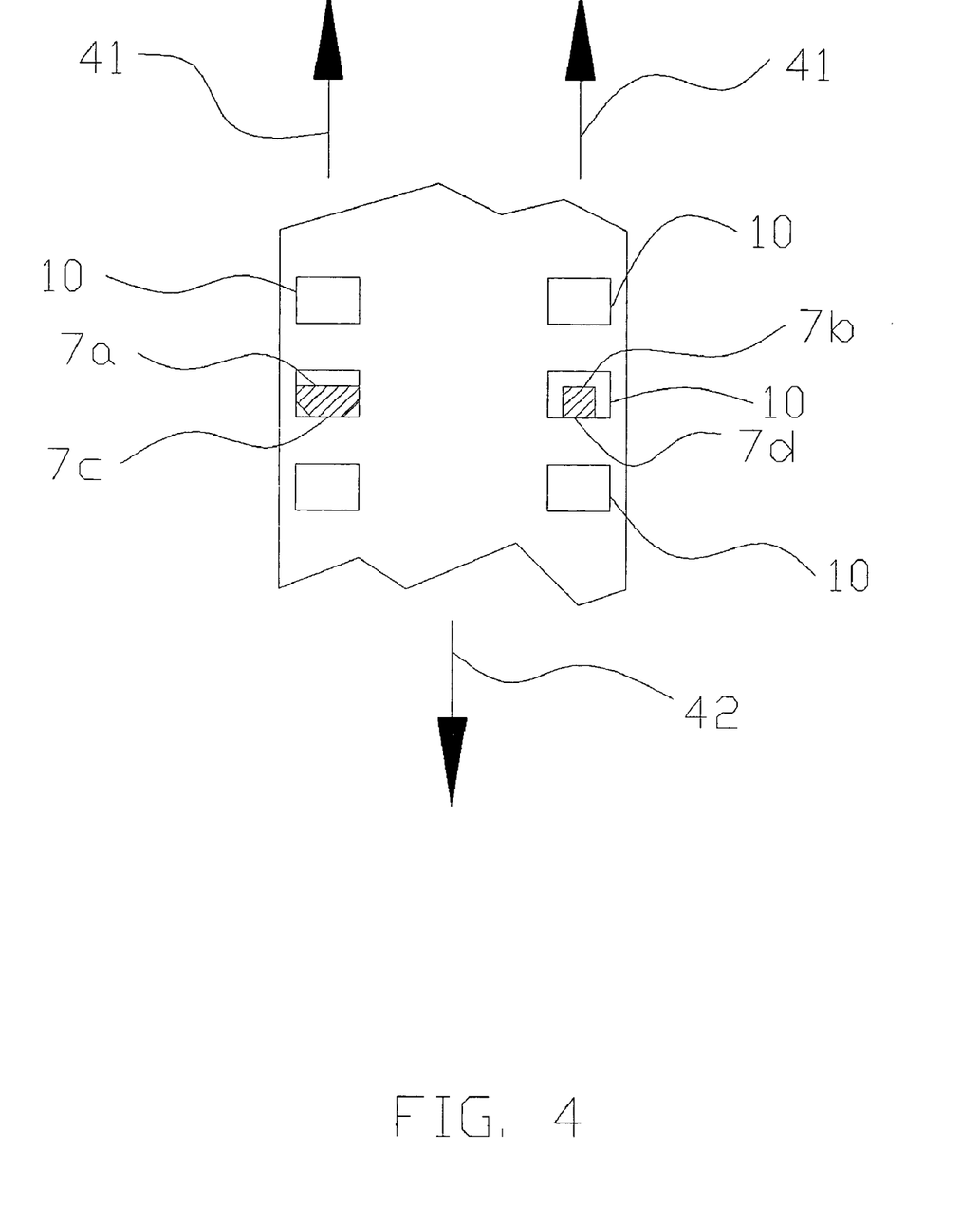
FIG. 4 is a an enlarged fragmentary view showing a film strip with perforations exaggerated in size to illustrate a full fitting sprocket tooth on one side of a dual sprocket and a shrinkage sprocket tooth on the other side of the dual sprocket, both teeth engaged with the perforations of the film.

The present invention provides means for ensuring that the perforations 10 on both sides of the films uniformly contact the sprocket teeth 7a and 7b under tension which is equalized on both sides of each film. FIG. 4 is an enlarged view exaggerated in size for clarity showing the row of perforations 10 on each side of the film (which can be either the negative 3 or raw stock 4). The full fitting sprocket teeth 7a match the width of the perforation on one side of the sprocket. The shrinkage sprocket teeth 7b are narrower than the perforation width. In both cases the present invention applies a uniform tension to both films 3 and 4. The films are pulled upwardly under tension as the sprockets rotate to move the films past the aperture 27. The uniform tension forces are applied against the bottom 7c of the full fitting sprocket teeth 7a and against the bottom 7d of the shrinkage sprocket teeth 7b as the sprocket rotates. The arrows 41 in FIG. 4 show the direction of film tension against the sprocket teeth on opposite sides of the films. The arrow 42 in FIG. 4 shows the direction of film travel.

Figure 5:
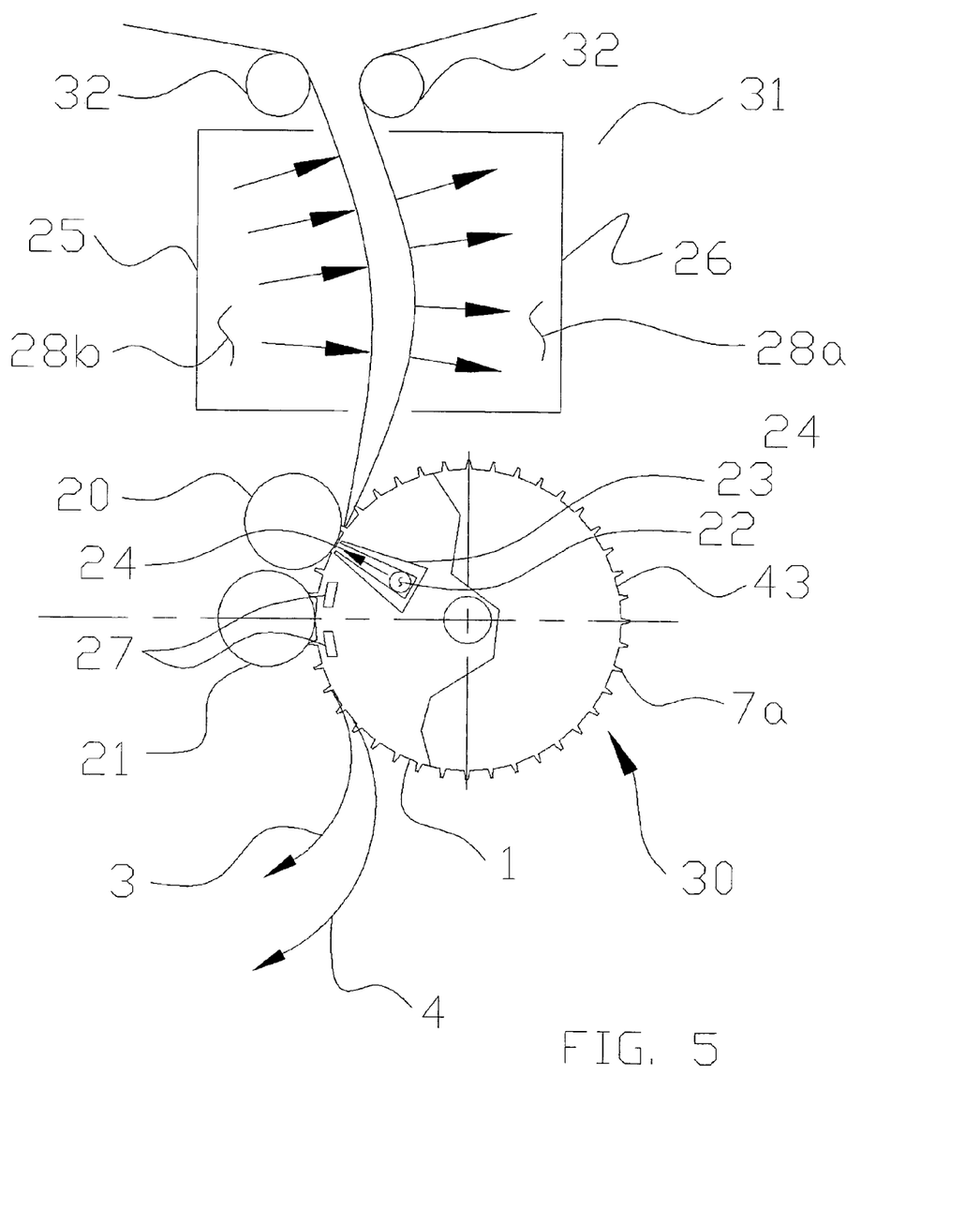
FIG. 5 is a semi-schematic side elevational view showing a pneumatic film tension equalizer for a dual sprocket contact film printer for maintaining film steadiness according to principles of this invention.

FIG. 5 shows one embodiment of the present invention which comprises a fluid chamber 31 positioned above the printing sprocket 30. The exposed film 4 and raw stock film 3 pass around separate in-feed rollers 32 above the chamber and then through the chamber and then pass outwardly from the chamber and into contact with the dual sprocket 30. Tension on the negative 4 is produced by a fluid 28a (either gas or liquid) under vacuum in a vacuum chamber side 26 of the chamber 31. FIG. 4 also shows tension on the raw stock 3 being produced by a fluid 28b (either gas or liquid) applied to the R/S under positive pressure in a pressure chamber side 25 of the chamber 31. (The fluid pressure can be applied pneumatically by positive and negative gas pressure or hydraulically by a liquid which might be organic or inorganic.) In one embodiment, the vacuum is produced by a vacuum hose attachment through an opening in the chamber 26 on the right side of the negative 4, and the positive pressure is applied by a gas pressure source attached to an opening in the chamber 25 on the left side of the raw stock 3. The approach shown in FIG. 5 has been shown to be satisfactory for producing equalized tension on both sides of both film strips 1 thereby producing steady prints.

More specifically, and referring now to FIG. 5, the vacuum applied to the negative 4 deflects the film in the chamber 26 which causes the perforations to pull up against the sprocket teeth on both sides of the negative film. The positive pressure applied to raw stock 3 also deflects the film inside the chamber 25 and causes the perforations to pull up against the sprocket teeth on both sides of the film. The fluid pressure contained in the chamber housing is applied uniformly across the face of each film causing the tension forces on the sprockets to be equalized. If the films become offset or are twisted going into the chamber, for example, the films are self-aligned by the equalized fluid pressure on both films, causing the films to both fit solidly under tension uniformly against the bottoms of the sprocket teeth. The result is that the films when passing from the chamber into the aperture will be constantly maintained in face-to-face contact under equal tension in alignment with the center line 18. (It is especially preferred that chamber 25 be sized so as to provide sufficient spacing to allow the film to travel through it without contacting or scratching the film edge but be minimized in width so that the gaps between the film and the chamber walls are approximately 0.01 inches. This allows the pressures on the film to deflect the film and properly align the films which would be less effective in a chamber with excessive gaps.)

Figure 6:
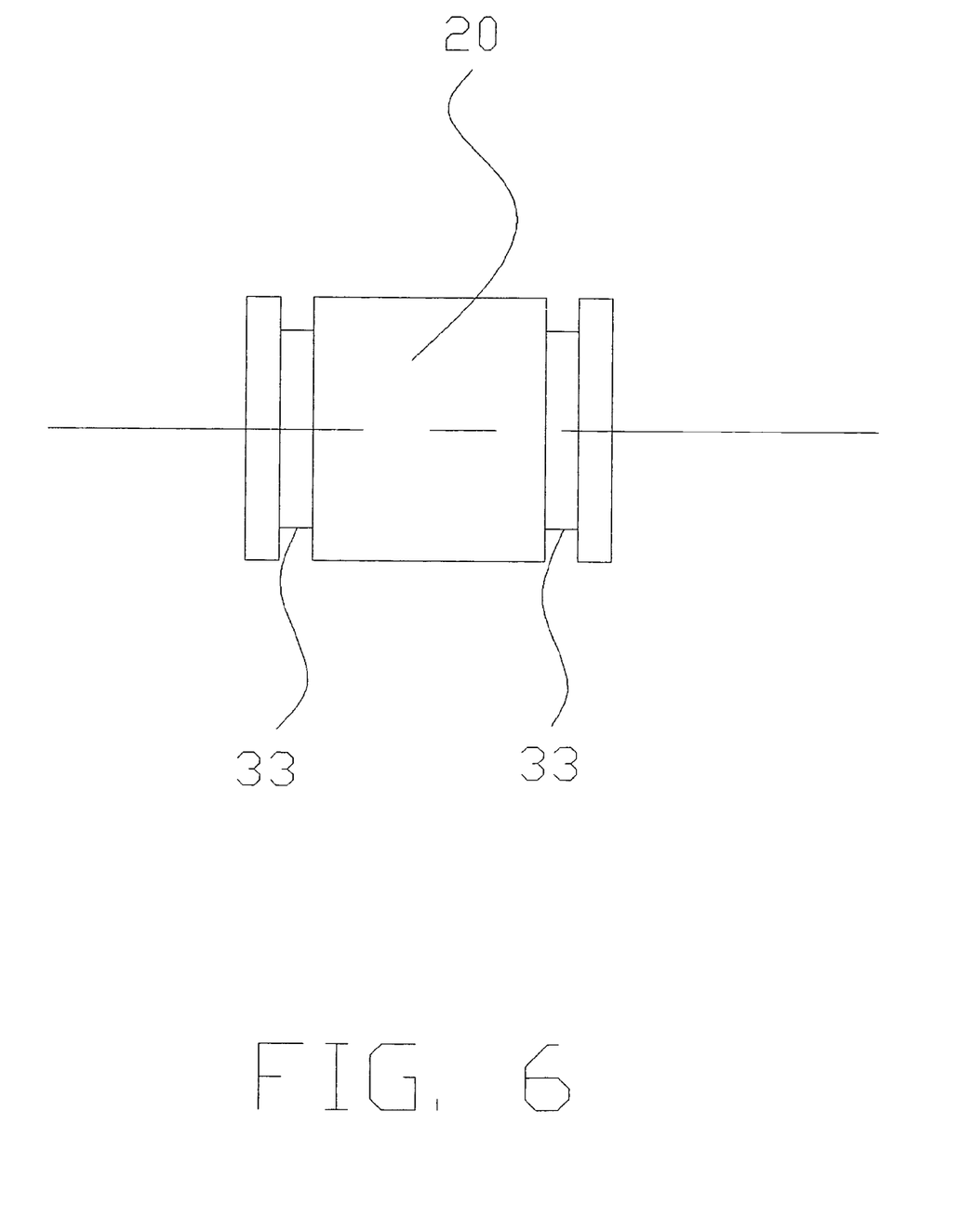
FIG. 6 is an enlarged elevational view showing an upper gate roller and its means for engaging the sprocket.

FIGS. 5 and 6 show an upper gate roller 20 which holds the overlapping films in contact with the sprocket teeth so as to maintain contact prior to the films entering the aperture. This roller includes parallel grooves 33 engaged with the opposite sides of the sprocket. The central portion of the upper gate roller maintains the films in contact via the roller pushing against the films to hold the perforations against the bottoms of the sprocket teeth. The roller does not apply a compressive force but leaves a minimal gap of no more than about one one-thousandth of an inch which is sufficient to maintain the films pressed against each other and against the root of the sprocket at the bottom of the sprocket teeth. The root of the sprocket is shown at 43 in FIGS. 5 and 7.

As shown in FIG. 5, when negative 4 and raw stock 3 leave vacuum chamber 26 and pressure chamber 25, fluid from either side may become trapped between the negative 4 and raw stock 5. In order to squeeze the fluid out from between negative 4 and raw stock 3, the system incorporates a nozzle 23 located within the print sprocket 30 and directed toward the upper gate roller 20 at a point prior to the films passing in front of the film aperture 27. Fluid enters nozzle 23 through a source of pressurized fluid 22. The nozzle has a narrow elongated opening positioned parallel to the face of the film and parallel to the axis 15 in FIG. 3. The fluid from the nozzle produces a force at 24 against the film which squeezes out the liquid or other fluid from between the films 3 and 4 prior to the films entering aperture 27. This maintains face-to-face contact with the films at the aperture which enhances film resolution.

As mentioned, it is important for both negative 4 and raw stock 3 to be tightly engaged against the root 43 of the sprocket and the bottom of the sprocket teeth 7a and 7b before the films pass aperture 27. For this reason, in an especially preferred embodiment, the invention incorporates upper gate roller 20 and, in order that negative 4 and raw stock 3 remain in good contact at the aperture, lower gate roller 21. Lower gate roller 21 has the same configuration as the upper gate roller. These rollers cooperate to force the raw stock 3 and negative 4 together against root 43 of the sprocket on the full fitting sprocket 1 and the shrinkage sprocket 6, before the films pass aperture 27 and at the time they pass the aperture.

Figure 7:
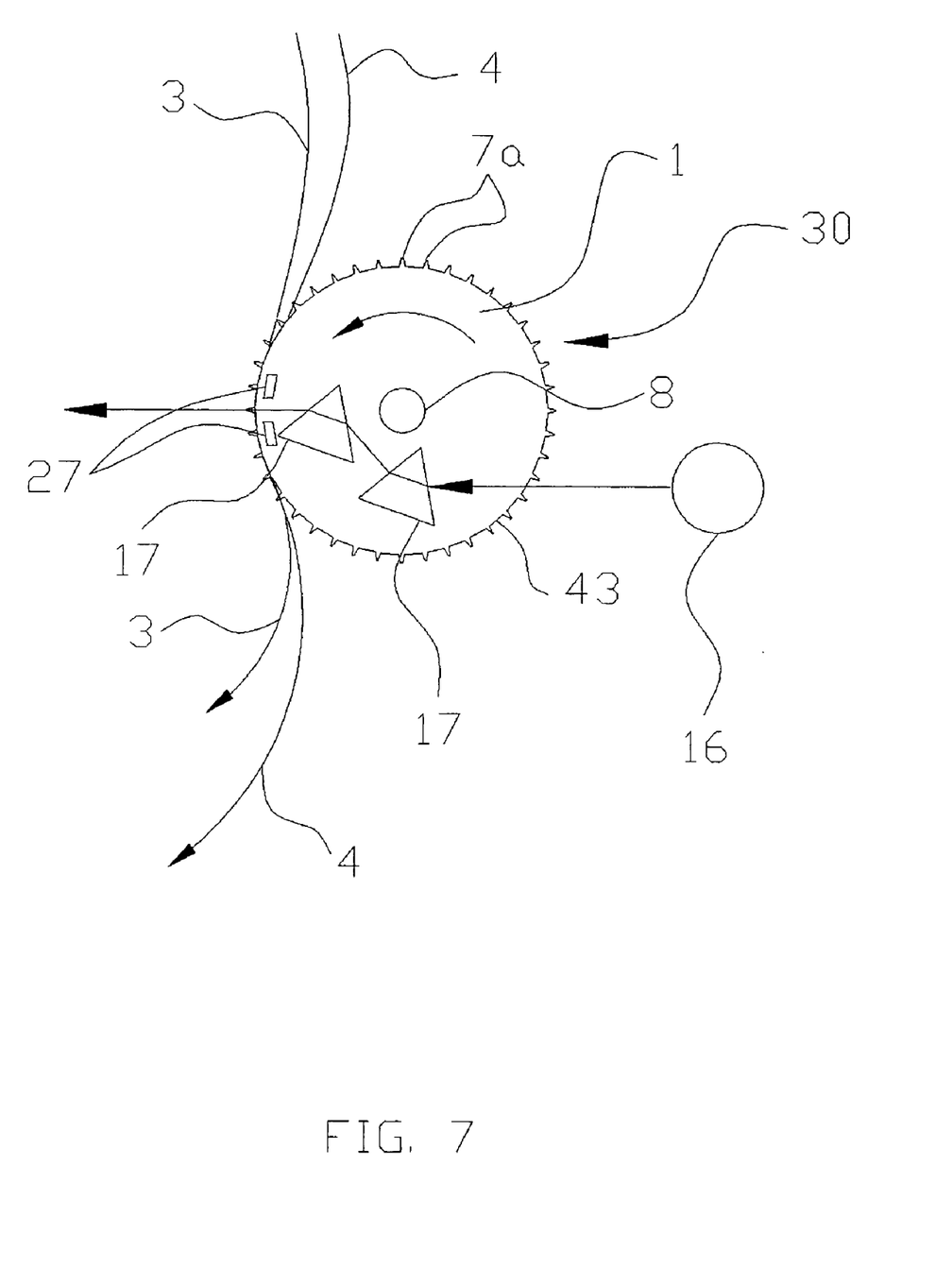
FIG. 7 is a schematic side elevational view showing a pair of prisms used to divert a light path when exposing the raw stock film.

FIG. 7 shows the film being illuminated by a light source 16 located to the right of the sprocket. When a dual sprocket is used, as shown in FIGS. 3 and 5, the common shaft 8 can interfere with the light. To avoid this interference, the light path is changed so that the light passes through and is deflected by two glass prisms 17 shown in FIG. 7.

Figure 8:
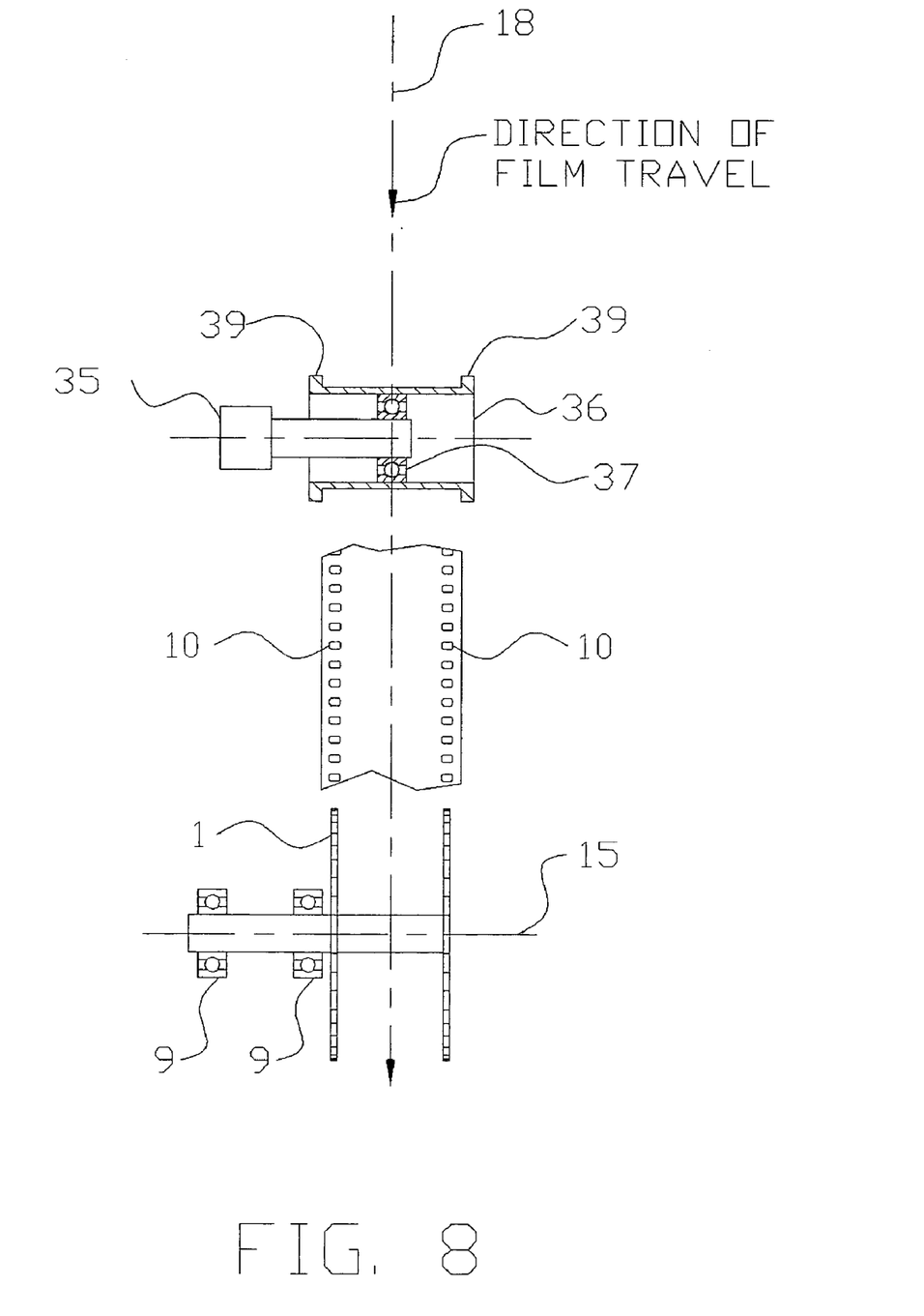
FIG. 8 is a semi-schematic elevational view showing a front view of a self-aligning roller comprising an alternative means for equalizing film tension.
Figure 9:
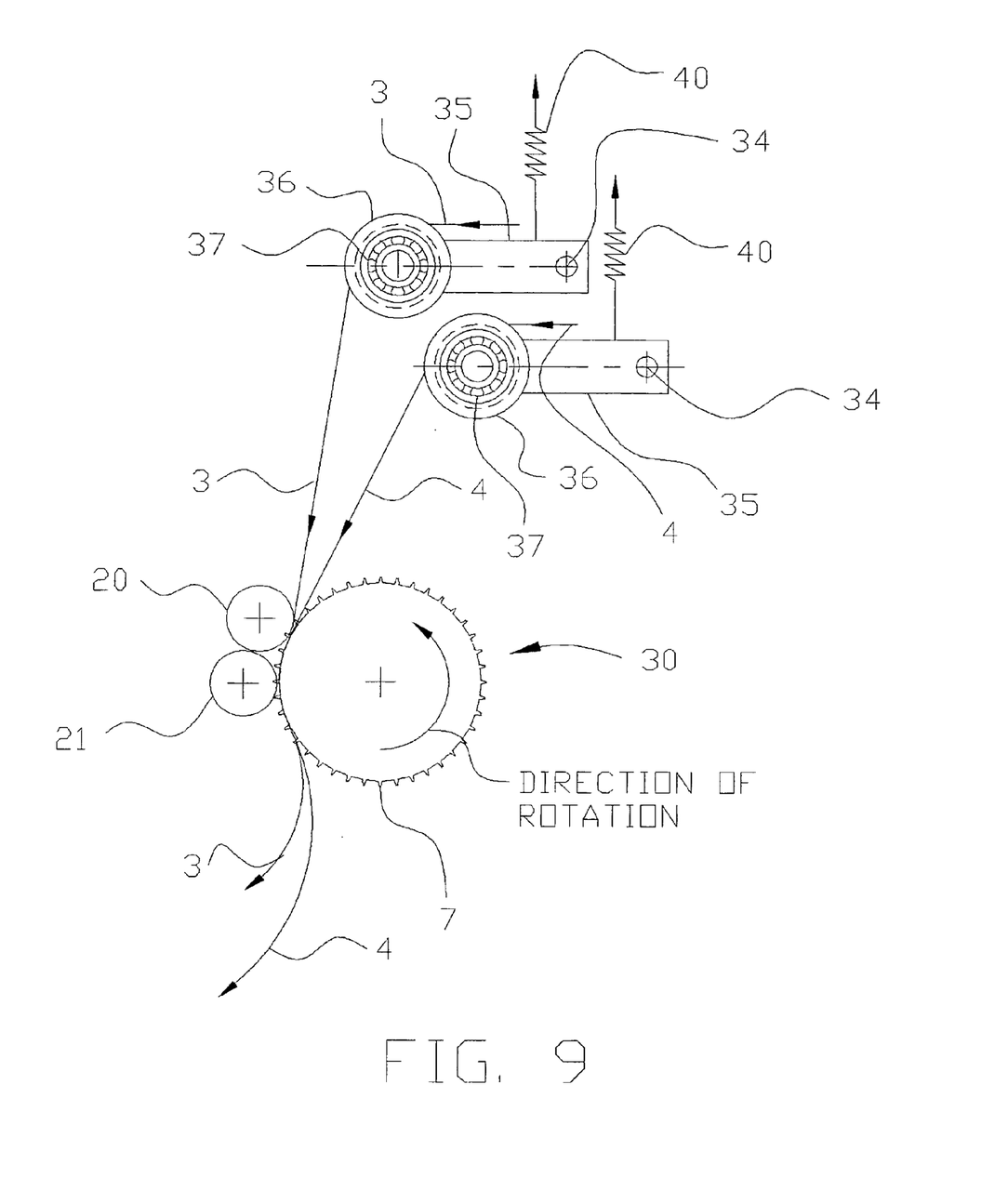
FIG. 9 is a side elevational view of the self-aligning roller of FIG. 8.

FIGS. 8 and 9 show an alternate embodiment of the present invention using a self-aligning roller arrangement to equalize film tension. This embodiment uses a pair of self-aligning rollers 36 each having flanges 39 at opposite ends similar to a spool. The rollers are both positioned above dual sprocket 30 similar to the arrangement shown in FIG. 5. Raw stock film 3 passes over the top of uppermost roller 36 and negative film 4 passes over the top of lowermost roller 36. The flanges on the sides of the rollers maintain the axis of the film perpendicular to axis 15 of the sprocket shaft. However, in contrast to prior art rollers, each self-aligning roller 36 is mounted on a separate elongated lever arm 35 having a pivot point 34 spaced from the roller. Separate springs 40 mount the lever arms for spring-biased travel about the pivot axis. The opposite end of each lever arm carries a shaft which extends into a corresponding roller. Each shaft holds a self-aligning bearing 37 that mounts the roller for rotation about the shaft. The self-aligning bearings cause the rollers to tilt, say a few thousandths of an inch, to adapt to slight misalignments of the film from axis 18, causing film tension on one side or the other to be self-adjusted to equalize the tension and thereby maintain film alignment whereas prior spring tensioning rollers 5 had no such ability to tilt or compensate for slight misalignments.

While the invention has been described herein with reference to certain preferred embodiments, those embodiments have been presented by way of example only, and not to limit the scope of the invention. Additional embodiments thereof will be obvious to those skilled in the art having the benefit of this detailed description. Further modifications are also possible in alternative embodiments without departing from the inventive concept.

Accordingly, it will be apparent to those skilled in the art that still further changes and modifications in the actual concepts described herein can readily be made without departing from the spirit and scope of the disclosed inventions as defined by the following claims.

What is claimed is:

1. A method of feeding a film negative and a raw stock film onto a dual sprocket of a film printer which feeds the negative and the raw stock to an aperture for exposing the negative and the raw stock to a light source as the dual sprocket rotates to move the negative and the raw stock past the aperture, both the negative and the raw stock having a left side with a left set of perforations, a right side with a right set of perforations, an emulsion side and a cell side, the negative and the raw stock being fed so that the emulsion sides are facing each other, the dual sprocket having a full fitting sprocket and a shrinkage sprocket, comprising the steps of:

feeding the negative and the raw stack into a chamber;

applying a first pressure in the chamber to cell side of the negative;

applying a second pressure in the chamber to the cell side of the stock; and feeding the negative and the raw stock from the chamber to the dual sprocket;

wherein the negative and the stock are deflected in the same direction in the chamber; and wherein the first and the second pressure cause both the left and the right set of perforations of the negative and the raw stock to contact teeth of the dual sprocket under tension.

2. The method of claim 1, comprising the additional step of using at least one roller to force the negative and the stock against a first root of the full fitting sprocket and a second root of the shrinkage sprocket.

3. The method of claim 1, wherein the chamber is filled with a liquid and both the first and the second pressures are hydraulic pressures.

4. The method of claim 3, comprising the additional step of using a pressurized fluid to force out any liquid trapped between the emulsion sides of the negative and the stock so that said emulsion sides are in face-to-face contact when they move past the aperture.

5. The method of claim 1, wherein the chamber is filled with a gas and both the first and the second pressures are pneumatic pressures.

6. The method of claim 1, wherein the left set of perforations of the negative and the raw stock and the right set of perforations of the negative and the raw stock uniformly contact teeth of the dual sprocket under tension which is equalized on both the left and right sides of the negative and the raw stock.

7. The method of claim 1, wherein the first pressure is a negative pressure and the second pressure is a positive pressure.

8. A contact film printer having a sprocket for engaging spaced-apart perforations along both sides of a film entering the printer, the printer having an aperture for exposing overlapping films to light as the sprocket rotates to move the films past the aperture, and a fluid chamber positioned adjacent the sprocket ahead of the aperture, the films passing under tension through the fluid chamber prior to passing through the aperture, the fluid chamber containing a source of fluid applied to one or more faces of the films to pull the film perforations against the sprocket teeth on the rotating sprocket on both sides of the sprocket so as to equalize the tension on both sides of the films for engaging the perforations on both sides of the films with the sprocket teeth equally as the sprocket rotates to move the film past the aperture.

9. The apparatus of claim 8 in which the overlapping films comprise a negative film and a raw stock film, and in which both films are tensioned by the fluid pressure contained in separate chamber sections of the fluid chamber.

10. The apparatus of claim 8 in which the overlapping films comprise a first film subjected to negative pressure inside the chamber for pulling the film against the sprocket teeth on the sprocket, and a second film subjected to positive fluid pressure inside the chamber for pulling the perforations of the film against the sprocket teeth on both sides of the sprocket.

11. The apparatus of claim 8, further comprising an upper gate roller maintaining the overlapping films in contact with each other with the perforations against the root of the sprocket teeth on both sides of the sprocket at a point between the fluid chamber and the aperture.

12. The apparatus of claim 11, further comprising a lower gate roller for pressing the overlapping films into contact below the upper gate roller and in the vicinity of the aperture.

13. The apparatus of claim 11, further comprising an elongated nozzle for applying fluid pressure to the overlapping films on a side opposite the upper gate roller for squeezing any fluid out from between the films prior to the films passing through the aperture.

14. The apparatus of claim 8 in which the sprocket is a dual printing sprocket comprising a full fitting sprocket on one side and a shrinkage sprocket on the other side.

15. The apparatus of claim 8 in which the fluid chamber comprises separate chamber sections each containing either gas or a liquid for applying tension to the overlapping films.

* * * * *